Patented July 13, 1937

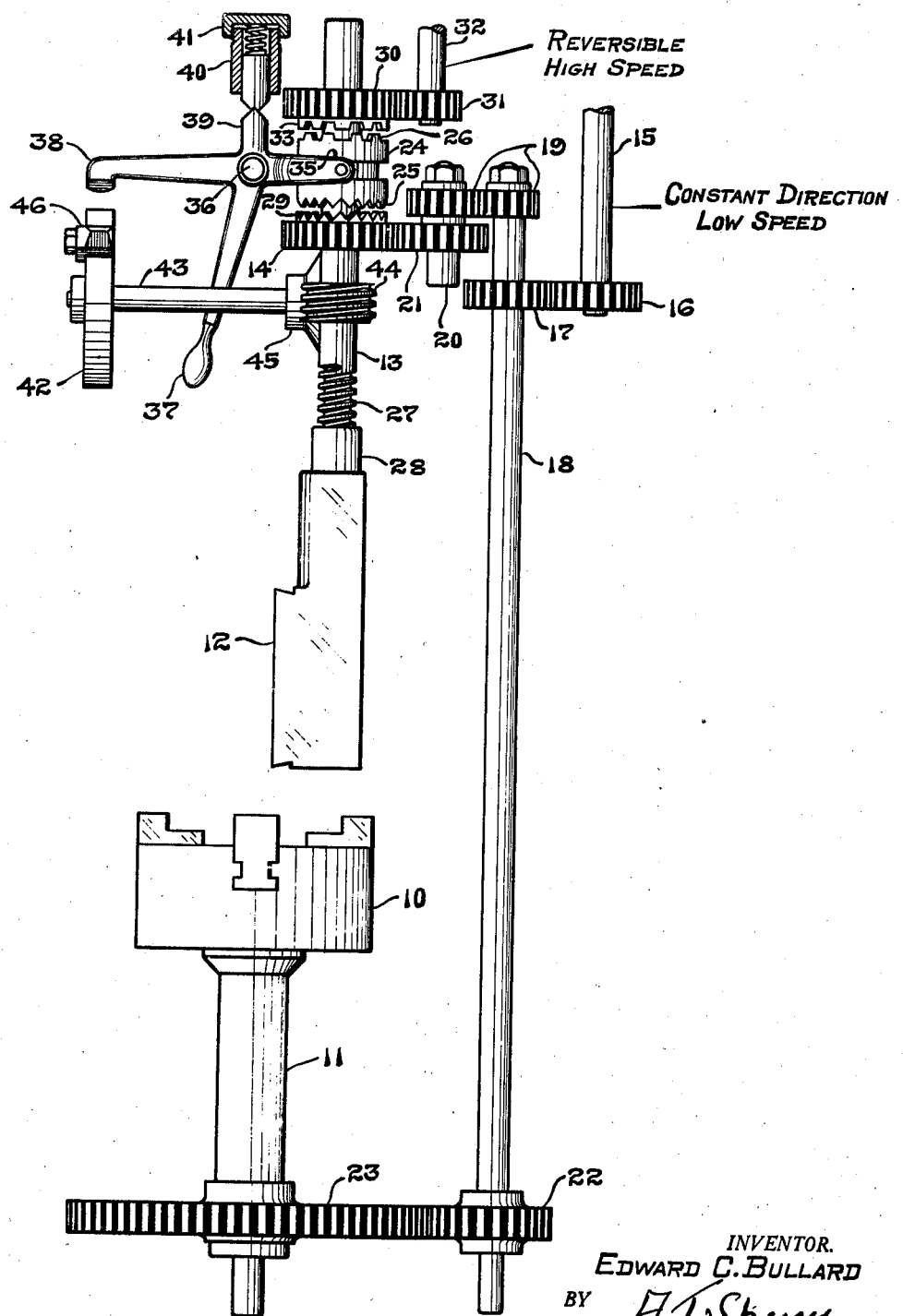

2,086,846

UNITED STATES PATENT OFFICE 2,086,846

FEED WORKS

Edward C. Bullard, Fairfield, Conn., assignor to The Bullard Company, a corporation of Connecticut Application May 25, 1934, Serial No. 727,440

23 Claims. (Cl. 82—21)

This invention relates generally to driving means for elements of machine tools, the invention being broadly applicable to various metal working tools and various elements thereof, although being here illustrated and described for use as a feed works in connection with the tool heads of metal turning lathes.

While the general objects of the invention are to provide simplicity, automaticity, increased flexibility, ease of control and increased speed of the operating cycle, it is among the more specific objects to provide in combination two independent driving trains for a desired element of a machine tool.

A further important object is to provide simplicity of structure whereby the arrangement avoids unnecessary parts and loss of energy and unfaithfulness in the transmission of movement between parts. This object is carried out by the use of driving means and driving control means mounted directly on the feed shaft of the apparatus, as distinct from prior art, in which such means, in the form of gears and clutches, are mounted on separate shafts.

Another object is to provide, in such a simple, compact arrangement, torque-responsive means entering into the control thereof for automatically weighing the load whereby the desire for self-contained automaticity may be served.

Another object is to provide a feed works embodying the general objects set forth, which will also provide a drive for another element of the tool, such as the work spindle, and to provide such drive in variable synchronism with the feed of the other element, such as the tool head.

Numerous other objects, both general and specific, will be apparent from a consideration of the present specifications taken in conjunction with the drawing in which:

The figure is a side elevation, illustrating the drive of a single tool head and a single spindle through the use of the present invention.

For purpose of illustration, the invention is here shown as applied to a single spindle, single tool head machine. It is, however, distinctly understood that the feed works here illustrated is broadly applicable, not only to a single spindle machine with plurality of tool heads and a plurality of feed works to operate them, but also to multiple spindle machines, for instance, those of the type shown in Patent 1,360,175. It may thus be said that the essence of the invention resides in a feed works having novel, independent feed and traverse drives with suitable automatic control arrangement, which preferably includes a load weighing device. The invention is, therefore, not limited in its application to any specific machine tool structure.

In general terms, the invention includes a single shaft, which may be in the form of a screw, the rotation of which may directly actuate one element of the machine tool such, for instance, as the tool head. This shaft may be selectively driven by either one of a pair of driving gears, preferably mounted directly thereon and selectively connected for driving by means of a movable clutch splined to the shaft and engageable with either of said gears. One of the gears may be driven at a speed such as to deliver to the shaft a rotation suitable for the moving of the tool head at feeding speeds, and it is preferable that such drive be established at a rate synchronous with the drive to the companion element of the tool, such as the work holder. For this purpose, the work spindle is driven from the shaft included in the drive train for the feeding gear. Suitable means, such as pick-off gears, may be provided for varying the relation of synchronism.

The other gear is adapted to be reversibly driven at a higher rate of speed, so as to impart a rapid downward movement of the head toward a cutting position and an equivalent rapid return movement of the head after the feeding movement. Such rotation is preferably independent of the work spindle.

For selectively clutching and unclutching of the shaft with the gears, an automatic mechanism is provided whereby, after initiation of operation, dogs carried by a timing disc operated with the feed shaft, will automatically time the actuation of the clutch so that various and widely flexible cycles of operation may be provided. One important feature of the invention is the adoption of automatic means for throwing the clutch, so as to disengage feed and to engage upward traverse as a result of a measured torque on the feed shaft. Thus, when the tool heads engage a positive stop or encounter a dangerous resistance to the feed of the tool, the clutch will be thrown automatically to retract the tool from the work. This feature of the invention includes an adjustable member for varying the resistance requisite to so moving the clutch. Thus, it is possible to weigh the load imposed upon the shaft and to control the shaft in accordance with such weighed load. The apparatus, however, may be designed to provide for the retraction of the tool head at a predetermined point in the cycle of operation, independent of imposition on the shaft of the selected clutch operating load.

The structure illustrated includes a specific lever arm arrangement for manipulation of the clutch by the disc. Obviously, various suitable arrangements could be utilized for this purpose, and the present illustration seeks only to disclose one operative assembly. The invention is broadly directed to suitable operating means functioning in cooperation with the separate driving trains, a timing disc, and a load-weighing device. Wide variation in the specific control structure is obviously permissible without departure from the spirit or scope of the invention.

Referring more particularly to the drawing, it will be seen that the illustrated embodiment of the invention contemplates its use as a feed works in a machine tool of the lathe type, which includes a work-holding chuck 10, mounted upon a work spindle 11, and a tool head 12, adapted to support a tool not shown and adapted to reciprocate toward and from the work carried by the chuck 10.

Since the invention is broadly applicable to single spindle machines having either one or a multiple of tool heads, or to multiple spindle machines, in which case a group of the feed work assemblies would be arranged to care for the related groups of work spindles and tool heads, this application is not concerned with the base or body of the machine tool, or with specific structure of the tool head, or chucks, or with the mounting of the shafts. The skeleton or diagrammatic view, therefore, suffices to illustrate one preferred relationship of the machine tool elements involved.

In turning lathes of the type contemplated, the cycle of operation is frequently as follows:— Work to be turned is placed upon the chuck 10, the tool head 12 is then brought down rapidly from an idle position to a point where the tools carried thereby are ready to start their cutting action. This movement is called the down-traverse movement. Thereafter, the head is fed slowly so as to move the tool at a cutting speed over the work surface. This movement is referred to as the feeding movement. At the completion of this movement, the head is rapidly withdrawn to the idle position, this latter movement being known as the up-traverse movement.

In the present invention, and for the purpose of carrying out the objects herein set forth, one gear indicated at 14, and referred to as the feed gear, is utilized for moving the head during the feeding movements and, since it is desirable that the speed of rotation of the work spindle be synchronized with that of the feeding movement, the spindle 11 is driven with the feed gear.

The feed gear 14, together with its companion traverse gear hereinafter referred to, is loosely mounted upon a feed shaft 13, and is adapted to be connected for driving the shaft 13 through a slidable clutch member hereinafter described. The feed gear 14 is driven in constant direction, in a suitable feeding speed, from a shaft 15, indicated on the drawing as "a constant direction low speed" shaft, the lower end of which is provided with gear 16, which meshes with a companion gear 17, on a shaft 18, drive from which to the gear 14, being provided through primary and secondary pull gears 19; the primary gear being mounted on shaft 18 and the secondary gear being mounted on stud 20, carrying the gear 21, meshing with the feed gear 14. By means of the pull gears 19, it will be seen that the speed of the gear 14 may be readily varied with the speed of the shaft 18. The shaft 18 has provided, on its lower end, a gear 22, meshing with a spindle gear 23 mounted on the spindle 11. By this arrangement, it will be noted that the feed gear is, at all times, rotated in synchronism with the drive for the spindle, but variations in the speed ratio may be had through changing the pull gears 19, or through the use of an equivalent change speed mechanism.

For selectively connecting the shaft 13, with the gear 14, or with its companion traverse gear, a sliding clutch 24 is provided, which is in the form of a double clutch having, on either end, clutch teeth 25 and 26 and being splined to the shaft 13, so that, with the clutch teeth in engagement with either of the gears, the shaft will be rotated by the gear to which the clutch is connected. It will be understood that the lower end of the shaft 13 is provided with threads 27, which engage corresponding threads in a collar 28 of the tool head 12, whereby rotation of the shaft 13 will impart movement of the head towards or from the work spindle in accordance with its direction of rotation.

One important feature of the invention is the design of the inter-engaging clutch teeth between the clutch 24 and the gear 14, the angular relation of the teeth being such that, in driving relation, there is a constant tendency for the teeth 29 of the gear 14 to cam upwardly and out of engagement teeth 25 and the clutch 24; such action is, however, restrained through the clutch control assembly hereinafter described, which may be briefly stated to include a variable balancing means so as to variably control the pressure required to throw out the clutch. By this means, automaticity in operation and an increased safety factor is provided, since, when the head 12 strikes a fixed stop or should the tool encounter excessive cutting strains, the torque, between the gear 14 and the clutch 24, will be such as to throw out the clutch.

For moving the tool head in traverse, either up or down, a reversible traverse gear 30 is utilized, being loosely mounted on shaft 13 as is its companion feed gear 14. Since there is no occasion for the spindle to be driven in synchronism with the traverse movement, there is no connection from the traverse drive train for driving the spindle. As shown, the gear 30 is provided with teeth 33, corresponding with teeth 26 of clutch 24, while these teeth may be of the slanting edge type, as are teeth 25 and 29, they are here shown as of more conventional form. The gear 30 may be directly driven by a gear 31, mounted on a shaft 32, which, as indicated on the drawing, is a "reversible high speed" shaft. The speed of rotation of the shafts 15 and 32, while preferably being low and high respectively, may, of course, be equal or of converse ratio. Since the speed of rotation of the gears 14 and 30 are the controlling factors and, since the ratio of gearing between the shafts and the gears may be varied to provide low and high speed for the gears 14 and 30 respectively. It will, also, be understood that the present invention is not concerned with the manner of drive for the shafts 15 and 32, obviously, they may be driven from a single source of power, or may be individually driven, and the control for the drives of such shafts may be in any desired manner, the same forming no part of the present invention. For one preferred manner of driving and controlling these shafts, reference may be had to my companion application, filed June 7, 1934, Serial Number 729,366.

From a consideration of this structure, it will be seen that, with the gear 14 running and the clutch 24 in downward position, engaging the gear, the tool head will be fed towards the work at feeding speed synchronized with the speed of the work spindle 11, both being driven from the shaft 18, the feed being variable with respect to the speed of the spindle by the selection of the gears 19 of the proper ratio; such feed being dependent on a driving torque less than that required to throw clutch 24 out of engagement. For traverse or rapid movement of the tool head, in either upward or downward direction, the tool head is driven from the gear 30 independent of the drive of the spindle, thus, when the clutch 24 is in a raised position engaging gear 30, the tool head will be moved rapidly in a direction corresponding to that in which the gear 30 is then rotated. It will be noted that the clutch 24 has a neutral position, in which position it is shown in the drawing; and thus, it is possible to arrange the cycle of operation such that, either or both of the gears may be running without the tool head being moved. Further, it will be noted that there is no restriction on the type of cycle which may be utilized. The machine is thus fully flexible, the arrangement being such that the spindle may have its drive continued from the shaft 18 after the feeding motion is stopped, and while the gear 30 is operating to move the tool head at traverse speed.

For controlling the clutch 24, manually and automatically, in addition to its torque-responsive movement, a clutch throwing yoke 35 is provided with a fulcrum at 36 and having a manual operable handle 37, a cam arm extension 38 and, in addition to this, an upwardly extending arrowhead 39, which is adapted to co-act with a spring-urged arrowhead plunger 40, the spring of which is subject to variable tension by adjustment of a housing cap 41, which may be screwed down to control the tension applied by the spring for downwardly urging the plunger 40. Means for securing the clutch in neutral position may be provided for by a notch in the apex of the plunger 40, which may receive the apex of the arrowhead 39, thus to lightly retain the clutch in neutral position from which it may be suitably moved in either direction by the handle 37.

For automatically controlling the clutch by movement of the cam arm 38, a timing disc 42 is mounted upon the shaft 43 adapted to be rotated with the rotations of the shaft 13 by virtue of a helical gear 44 carried by the shaft 13 and meshing with a corresponding gear 45 mounted upon the shaft 43. The disc 42 is provided with one or more operating cams 46, while the cam 46 and timing disc 42 are here arranged in simple form so as to act merely to move the clutch downwardly from traverse position to engage the gear 14 for feed. It will, of course, be understood that the cam may engage both sides of the arm 38 so as to positively move it in either direction. In the arrangement here shown, it is understood that upon increase of torque, such as to overcome the tendency of the plunger 40 to hold the clutch in feed position, the cam action is such as to move the arrowhead 39 past the apex and the plunger 40 and thus fully into traverse position.

In the operation of the device, starting with the parts as shown with the clutch in neutral, the operator first moves the lever 37 inwardly, thus moving the arrowhead 39 from the neutral notch and to the left, whereupon, the left side of the plunger 40 bears against the right face of the arrowhead 39, urging the clutch upwardly to fully engage the gear 30, and starting the down-traverse of the tool head 12 by rotating the feed shaft or the screw 13 and, with it, the timing disc 42. As the tool head terminates its downward traverse movement, and as the disc rotates therewith, the dog 46 strikes the lever 38, thus moving the lever arm upward in clockwise direction as opposed to the position it had been put in by the movement of the hand lever 37. This movement carries the arrowhead 39 to the right of the plunger 40, thus throwing the clutch 24 downwardly into feed. During feeding movement, the direction of the gear 30 is reversed, preferably automatically, by means not shown.

The feeding movement may be terminated either by the tool striking an abutment, or some interference, so that the pressure required for camming of the clutch is built up; or, if desired, a dog may be provided on the disc for actuating the lever 38, in either instance, the clutch 24 moves upwardly, thus moving the arrowhead 39 past the apex of the plunger 40 and toward the left, whereby the arrowhead completes the movement of the yoke causing engagement of the clutch 24 with the gear 30; the direction of rotation of the gear having previously been reversed. This engagement initiates the up-traverse of the tool head 12 and reverses the direction of rotation of the timing disc 42, its dog 46, or an equivalent one acting at the end of the traverse movement, to bring the clutch to neutral position.

In the foregoing description, it will be seen that the present invention forms a simple, compact and efficient feed works mechanism, which performs, in accordance with the objects set forth, to give simple, efficient and direct automatically controlled drive for the tool head. It will also be noted that by adjustments of the dogs of the timing disc, operating cycles of various characteristics may be provided. From this consideration, it will, therefore, be seen that numerous changes and modifications, and the full use of the equivalent, may be resorted to in the practice of the invention without departing from the spirit or scope of the invention as outlined in the pending claims.

Having thus set forth the nature of my invention, what I claim is:

1. In a machine tool feed works, the combination with a control means, therefore, of a timing disc for actuating said means and supplemental torque-responsive means for actuating said control means.

2. In a machine tool feed works, the combination with a tool feeding shaft, a constant direction gear for driving said shaft, a reversible gear for driving said shaft, both of said gears being freely rotatable with respect to said shaft, and a single clutch means for driving said shaft selectively from either of said gears.

3. In a machine tool feed works, the combination with a tool feeding shaft, a constant direction gear for driving said shaft, a reversible gear for driving said shaft, and a single torque-responsive means for driving said shaft selectively from either of said gears.

4. In a machine tool feed works, the combination with a tool feeding shaft of a reversibly driven gear loosely mounted on said shaft, a constant direction gear loosely mounted on said shaft, a single clutch rotatable with said shaft and movable to selectively connect either of said gears to said shaft for rotating the shaft thereby.

5. In a machine tool feed works, the combination with a tool feeding shaft of a reversibly driven gear loosely mounted on said shaft, a constant direction gear loosely mounted on said shaft, and a single clutch rotatable with said shaft and movable to selectively connect either of said gears to said shaft for rotating the shaft thereby, and a torque-responsive means for throwing said clutch from engagement with one of said gears.

6. In a machine tool feed works, the combination with a tool feeding shaft of a reversibly driven gear loosely mounted on said shaft, a constant direction gear loosely mounted on said shaft, a single clutch rotatable with said shaft and movable to selectively connect either of said gears to said shaft for rotating the shaft thereby, and means operable with movement of the tool slide for controlling said clutch.

7. In a machine tool feed works, the combination with a tool head and feed shaft, therefore, of a pair of independent operable gears loosely mounted on said feed shaft, a clutch on said feed shaft, means for moving said clutch to selectively engage either of said gears to drive said shaft, a timing disc operable with rotation of said shaft, a controller operable by said timing disc to control the movements of said clutch, and torque-responsive means operable independent of said disc to move said clutch from engagement with one of said gears.

8. In a machine tool feed works, the combination with a feed screw of a pair of independently rotatable driving gears, therefore, mounted loosely thereon, and a clutch rotatable with said screw to engage either of said gears to selectively rotate said screw by either of said gears.

9. In a machine tool, the combination with a feed shaft of a pair of independently rotatable gears loosely mounted thereon, a double clutch keyed to said shaft and slidable thereon between said gears to selectively engage either of said gears for driving said shaft, said clutch, and, at least, one of said gears having cooperative means operable to disengage said clutch and gear in response to predetermined torque therebetween.

10. In a machine tool, the combination with a feed shaft of a pair of gears loosely mounted thereon, a double clutch splined to said shaft and slidable thereon between said gears to selectively engage either of said gears for driving said shaft, said clutch, and, at least, one of said gears having cooperative means operable to disengage said clutch and gear in response to predetermined torque therebetween, and means operable upon such disengagement to cause the clutch to move into full engagement with the other gear.

11. In a machine tool, the combination with a feed shaft of a pair of independently rotatable gears loosely mounted thereon, a clutch splined to said shaft in between said gears and engageable selectively with said gears to drive said shaft selectively by said gears, said clutch, and, at least, one of said gears having cooperative slanting clutch teeth adapted, upon enmeshment, to urge the clutch from engagement with the gear.

12. In a machine tool, the combination with a feed shaft of a pair of independently rotatable gears loosely mounted thereon, a clutch splined to said shaft in between said gears and engageable selectively with said gears to drive said shaft selectively by said gears, said clutch, and, at least, one of said gears having cooperative slanting clutch teeth adapted, upon enmeshment, to urge the clutch from engagement with the gear, and a variable pressure means for urging said clutch and gear into enmeshment against the action of said teeth urging said clutch out of engagement.

13. In a machine tool, the combination with a feed shaft of a pair of gears loosely mounted thereon, a clutch splined to said shaft in between said gears and engageable selectively with said gears to drive said shaft selectively by said gears, said clutch and, at least, one of said gears having cooperative slanting clutch teeth adapted, upon enmeshment, to urge the clutch from engagement with the gear, a variable pressure means for urging said clutch and gear into enmeshment against the action of said teeth urging said clutch out of engagement, and means operable with said shaft for controlling the action of said pressure means.

14. In a machine tool, a work spindle, a tool head, a driving train for driving the work spindle, means for connecting said driving train with the tool head for feeding the tool head with the work spindle, a reversible driving train for moving the tool head toward and from the spindle, and a single clutch element for selectively driving said tool head from either of said means.

15. In a machine tool, a work spindle, a tool head, a driving train for driving the work spindle, means for connecting said driving train with the tool head for feeding the tool head with the work spindle, a reversible driving train for moving the tool head toward and from the spindle, and automatically-controllable single clutch element for selectively driving said tool head from either of said means.

16. In a machine tool, a work spindle, a tool head, a driving train for driving the work spindle, means for connecting said driving train with the tool head for feeding the tool head with the work spindle, a reversible driving train for moving the tool head toward and from the spindle, and automatically-controllable single clutch element, operable with movements of the tool head, for selectively driving said tool head from either of said means.

17. In a machine tool, a work spindle, a tool head, an operating shaft for said tool head, a driving train for driving the work spindle, a gear on said shaft connected with said driving train for feeding the tool head with the work spindle, an independent driving train, including a gear on said shaft, for moving the tool head toward and from the spindle, and a single clutch element for selectively coupling said shaft with either of said gears.

18. In a machine tool, a work spindle, a tool head, an operating shaft for said tool head, a driving train for driving the work spindle, a gear on said shaft connected with said driving train for feeding the tool head with the work spindle, an independent driving train, including a gear on said shaft, for moving the tool head toward and from the spindle, and torque-responsive means for selectively coupling said shaft with either of said gears.

19. In a machine tool, a work spindle, a tool head, an operating shaft for said tool head, a driving train for driving the work spindle, a gear on said shaft connected with said driving train for feeding the tool head with the work spindle, an independent driving train, including a gear on said shaft, for moving the tool head toward and from the spindle, and means for selectively coupling said shaft with either of said gears, and a timing disc for controlling said means.

20. In a machine tool, a work spindle, a tool head, a driving train for driving the work spindle, means for connecting said driving train with the tool head for feeding the tool head with the work spindle, a driving train for moving the tool head toward and from the spindle, means for independently driving each of said trains whereby they may be operated successively or concurrently, and torque-responsive means for connecting one or the other of said trains to drive said tool head.

21. In a machine tool, a work spindle, a tool head, a driving train for driving the work spindle, means for connecting said driving train with the tool head for feeding the tool head with the work spindle, a reversible driving train for moving the tool head toward and from the spindle, means for independently driving each of said trains whereby they may be operated successively or concurrently, and a timing disc for selectively connecting one or the other of said trains to drive said tool head.

22. In a machine tool, a tool head, a work spindle, means for driving said tool head and work spindle together, and an independent and reversible means for driving the tool head independent of the spindle, and torque-responsive element for determining the drive of said tool head.

23. In a machine tool, a tool head, a work spindle, means for driving said tool head and work spindle together, and an independent and reversible means for driving the tool head independent of the spindle, and a plurality of independently actuated means for determining the drive of said tool head, one of said latter means being torque-responsive.

EDWARD C. BULLARD.